Figure 2:
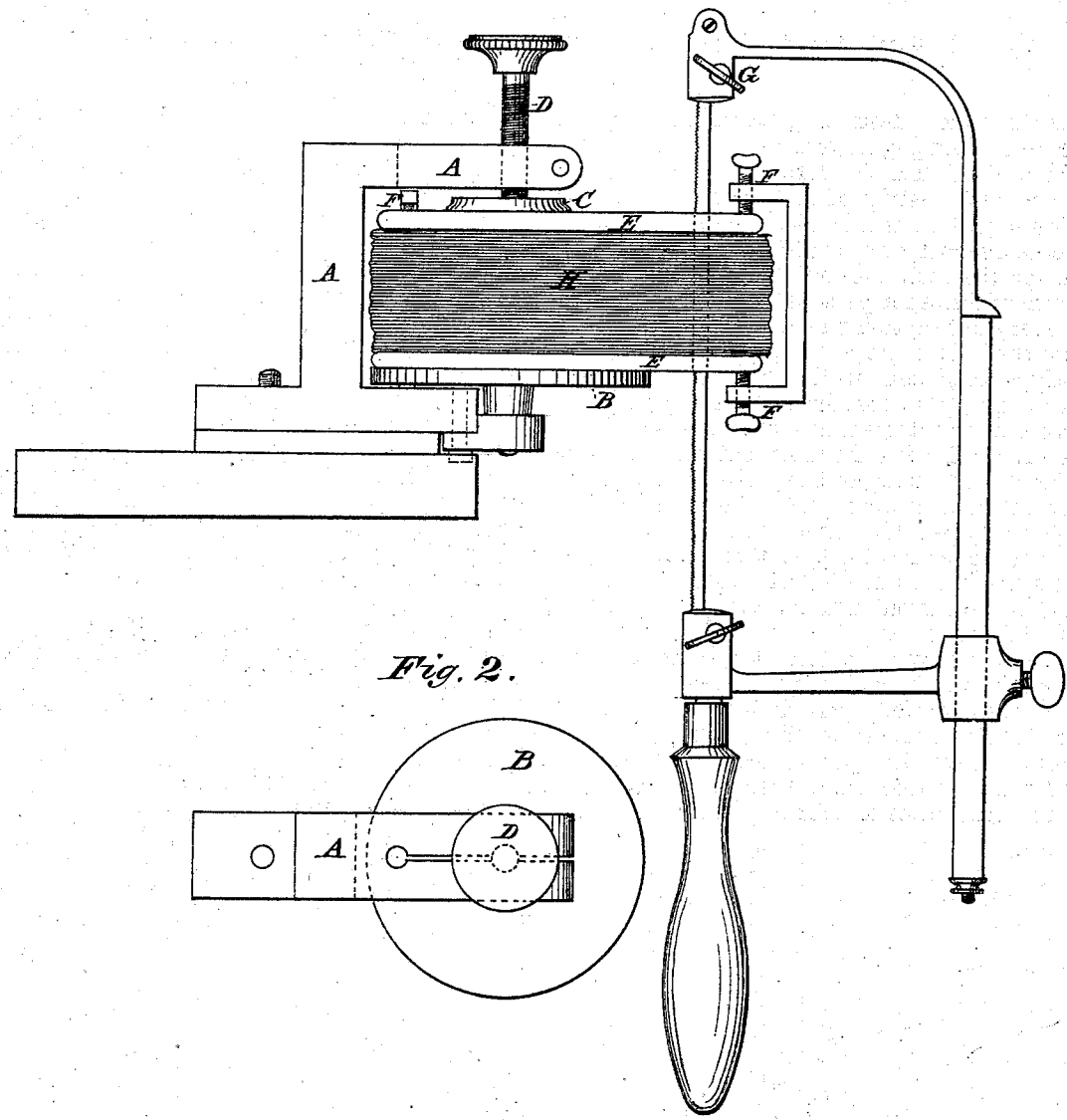

(38.)

ELIZA J. LAKE.

Improvement in Method of Cutting Cloth.

No. 122,260.      Fig. 1.      Patented Dec. 26, 1871.

Witnesses:
Alonzo Hughes
Jno. D. Patten

Inventor:
Eliza J. Lake

UNITED STATES PATENT OFFICE.

ELIZA J. LAKE, OF WASHINGTON, DISTRICT OF COLUMBIA.

IMPROVEMENT IN METHODS OF CUTTING CLOTH.

Specification forming part of Letters Patent No. 122,260, dated December 26, 1871.

Specification describing a certain Improved Method of Cutting Layers of Textile Fabrics, invented by ELIZA J. LAKE, of Washington city and county, District of Columbia.

My invention is a new and improved method of cutting cloth or other fibrous or textile material for the manufacture of clothing, garments, or other fabrics for personal or domestic use, and of every description which may require cutting from the bolt or piece.

My method consists in the use of a scroll or curve-cutting saw set in a vertical plane, so arranged as to intersect at right angles with a table provided with movable patterns or shapes, in clamps or guides, to be furnished or filled with any practicable number of bolts or pieces of cloth, which may be folded or laid in as many stratums as shall be required to be cut at the same time of the same given pattern, said pattern and materials to be moved against the saw by hand or mechanical power.

The saw may be constructed so as to be used by hand, like an ordinary scroll-cutting saw, or it may be operated by machinery; the cloth to be laid in folds or stratums and placed on a permanent table standing in a detached position under a platen pendent from the ceiling or frame-work, so constructed as to afford room for the operator to move freely on all sides of it; the platen or table to be provided with a screw, weight, or some equivalent compressing power, to hold firmly the pattern and material against the table so that they will not move or change their position during the operation of cutting.

If the folds be not too numerous they may be laid between pattern-boards or shapes, and placed in a vise so arranged as to afford the operator a full view of the pattern, and to enable him to saw out the many folds of cloth true to the line scribed or provided by the outside pattern. In such case trestles may be used instead of a table.

I am aware that knives and endless steel bands, having sharpened cutters or blades somewhat resembling saw-teeth in conformation, have been used for cutting cloth; but these have operated strictly to cut and not to saw, while my process is limited to sawing.

I claim—

The process herein described of simultaneously cutting many folds or layers of fibrous or textile fabrics by the use of a scroll-saw.

ELIZA J. LAKE.

Witnesses:
WM. G. HENDERSON,
W. G. CRANCH.

(38)